(12) United States Patent
Lee et al.

(10) Patent No.: US 11,555,904 B2
(45) Date of Patent: Jan. 17, 2023

(54) 3D CAMERA SYSTEM AND METHOD FOR DETECTING ABNORMAL STATE OF BEAM PROJECTOR MODULE FOR EYE PROTECTION

(71) Applicant: NAMUGA CO., LTD., Seongnam-si (KR)

(72) Inventors: Jun Youb Lee, Seongnam-si (KR); Ji Soo Won, Yongin-si (KR); Jung Ho Lee, Seoul (KR); Young Gyu Kang, Yongin-si (KR); Jeong Hwa Seo, Seongnam-si (KR)

(73) Assignee: Namuga Co., Ltd., Seingnam-si (KR)

( * ) Notice: Subject to any disclaimer, the term of this patent is extended or adjusted under 35 U.S.C. 154(b) by 777 days.

(21) Appl. No.: 16/557,459

(22) Filed: Aug. 30, 2019

(65) Prior Publication Data

US 2019/0383919 A1     Dec. 19, 2019

Related U.S. Application Data

(63) Continuation of application No. 16/201,124, filed on Nov. 27, 2018, now Pat. No. 10,444,331.

(30) Foreign Application Priority Data

Jun. 19, 2018  (KR) .................. 10-2018-0070058
Sep. 12, 2018  (KR) .................. 10-2018-0108851

(51) Int. Cl.
*G01S 7/48* (2006.01)
*G01S 7/497* (2006.01)
(Continued)

(52) U.S. Cl.
CPC ............ *G01S 7/497* (2013.01); *G01S 7/4814* (2013.01); *G01S 17/08* (2013.01); *G01S 17/89* (2013.01)

(58) Field of Classification Search
None
See application file for complete search history.

(56) References Cited

U.S. PATENT DOCUMENTS 6,714,286 B1   3/2004   Wheel
7,116,427 B2   10/2006  Baney et al.
(Continued)

FOREIGN PATENT DOCUMENTS

JP   2004341210 A   12/2004
JP   2013-164555 A   8/2013
(Continued)

OTHER PUBLICATIONS

English abstract of KR10-1853268; retrieved from www.espacenet.com on Aug. 30, 2019.
(Continued)

*Primary Examiner* — Hovhannes Baghdasaryan
(74) *Attorney, Agent, or Firm* — Polsinelli PC

(57) ABSTRACT

Disclosed is a system including: a beam projector module comprising a light source and an optical device configured to diffuse light output from the light source to reduce an intensity of the light; an image sensor configured to receive reflected light formed by the light reflected from an object; and a signal processing device configured to measure a distance from the object by analyzing a characteristic of the reflected light, wherein the signal processing device operates the beam projector module in an eye-safety mode when the characteristic of the reflected light corresponds to a crack characteristic.

10 Claims, 20 Drawing Sheets

(51) Int. Cl.
    *G01S 17/08*     (2006.01)
    *G01S 7/481*     (2006.01)
    *G01S 17/89*     (2020.01)

(56) References Cited

U.S. PATENT DOCUMENTS

| | | |
|---|---|---|
| 8,002,931 B2 | 8/2011 | Wang et al. |
| 10,069,275 B1 | 9/2018 | Lee et al. |
| 2005/0094154 A1* | 5/2005 | Baney ................. G06F 3/03544 |
| | | 356/499 |
| 2007/0064980 A1* | 3/2007 | Knox .................... G08B 17/10 |
| | | 382/128 |
| 2009/0140984 A1* | 6/2009 | Soo .................... G06F 3/03543 |
| | | 345/166 |
| 2012/0226268 A1* | 9/2012 | Liu ..................... A61N 5/0613 |
| | | 606/9 |
| 2013/0062536 A1* | 3/2013 | Bardos ............... G01N 21/9501 |
| | | 250/459.1 |

FOREIGN PATENT DOCUMENTS

| | | |
|---|---|---|
| KR | 10-0185797 B1 | 5/1995 |
| KR | 10-1824888 B1 | 2/2018 |
| KR | 10-1853268 B1 | 5/2018 |

OTHER PUBLICATIONS

English abstract of KR10-1824888; retrieved from www.espacenet.com on Aug. 30, 2019.

English abstract of JP2013-164555; retrieved from www.espacenet.com on Aug. 30, 2019.

English abstract of JP2004341210; retreived from www.espacenet.com on Jan. 22, 2020.

\* cited by examiner

FIG.17
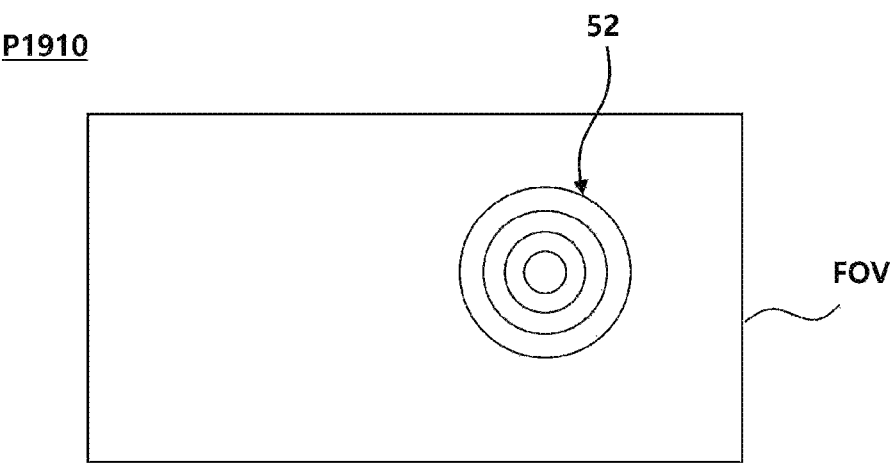
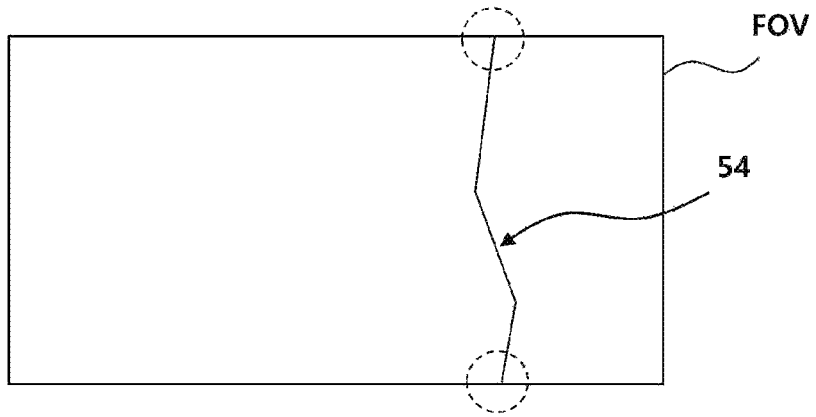

3D CAMERA SYSTEM AND METHOD FOR DETECTING ABNORMAL STATE OF BEAM PROJECTOR MODULE FOR EYE PROTECTION

CROSS REFERENCE TO RELATED APPLICATION

This application is a continuation of U.S. patent application Ser. No. 16/201,124, filed Nov. 27, 2018, which claims priority from Korean Patent Application Nos. 10-2018-0070058 & 10-2018-0108851, filed on Jun. 19, 2018 & Sep. 12, 2018, which are hereby incorporated by reference for all purposes as if fully set forth herein.

BACKGROUND

1. Field of the Invention

The present disclosure relates to a beam projector module.

2. Description of the Prior Art

Laser is an abbreviation of "Light Amplification by Stimulated Emission of Radiation" and may output light in an intensive and condensational manner. Further, laser may have monochromatic and directivity characteristics and may be variously used in optical sensor technical fields due to the characteristics.

For example, laser may be used as a light source of a distance measurement device or used as a light source of a 3-Dimensional (3D) depth camera. A distance measurement device in a Time of Flight (ToF) scheme may measure a movement distance of a pulse-shaped light wave, which is output from a light source, reflected from an object through a phase difference, measure a distance through the phase difference and information on a frequency, and extract distance information by forming a regular or irregular pattern through a diffuser having a laser light source as a source in Structure Light (SL) or a hybrid stereo type.

The laser may be used for measuring a distance and as a light source of a 3D depth camera due to a high energy and directivity characteristic thereof.

Meanwhile, the high energy characteristic of laser may have an advantage in that a flight distance of light can be increased and output of the returned light can be maintained at a predetermined level or higher, but may have a disadvantage in an aspect of safety. When high energy light is directly radiated to human's eyes, the light may damage the eyes and make the user blinded in an extreme case. Accordingly, when the laser is used as the light source, a safety problem should be always considered.

In general, every country has an eye-safety standard and an intensity of light output from a device is controlled to be equal to or lower than a reference value.

One of methods of controlling the intensity of output light is to dispose a diffuser capable of reducing the intensity of light on a light output path. The diffuser diffuses concentrated light to a predetermined Field Of View (FOV) required for a system due to an effect of refraction and diffraction using the property of light, so that the light passing through the diffuser has an intensity reduced per unit area.

However, when the diffuser is removed from the device for controlling the intensity of light through the diffuser, high-energy light is directly output and thus there is a safety problem.

SUMMARY

In the background, an aspect of the present disclosure is to provide technology for a beam projector module for providing an eye-safety function, a three-dimensional distance measurement system and method.

In accordance with an aspect of the present disclosure, a system is provided. The system includes: a beam projector module comprising a light source and an optical device configured to diffuse light output from the light source to reduce an intensity of the light; an image sensor configured to receive reflected light formed by the light reflected from an object; and a signal processing device configured to measure a distance from the object by analyzing a characteristic of the reflected light, wherein the signal processing device operates the beam projector module in an eye-safety mode when the characteristic of the reflected light corresponds to a crack characteristic.

In the system, the beam projector module may project image light comprising a particular pattern to the object, and the signal processing device may measure the distance from the object by recognizing deformation of the particular pattern, and when deformation of the particular pattern in a predetermined area in which a change in the distance is linearly formed is formed non-linearly, the characteristic of the reflected light may correspond to the crack characteristic.

In the system, the beam projector module may project image light comprising a particular pattern to the object, and the signal processing device may measure the distance from the object by recognizing deformation of the particular pattern, and when the deformation of the particular pattern in one area has an equal form at a plurality of different time points, it may be determined that the beam projector module has a fault on a part corresponding to the one area.

In the system, the signal processing device may output information on the one area to a host device comprising a User Interface (UI).

In the system, the beam projector module may project image light comprising a particular pattern to the object, and the signal processing device may measure the distance from the object and generate a three-dimensional image by recognizing deformation of the particular pattern, and when it is recognized that the three-dimensional image in one area has an equal form at a plurality of different time points, it may be determined that the beam projector module has a fault on a part corresponding to the one area.

In the system, when it is determined that the fault is generated in the one area, the signal processing device may generate the three-dimensional image by correcting a distance measurement value in the one area.

In the system, the signal processing device may correct the distance measurement value in the one area by averaging distance measurement values in surrounding areas of the one area.

In the system, when the characteristic of the reflected light is transformed in a concentric circle pattern, the signal processing device may determine that the characteristic of the reflected light corresponds to a crack characteristic.

In the system, when the characteristic of the reflected light is transformed in a pattern in which an edge of a Field Of View (FOV) is continuously connected to another edge, the signal processing device may determine that the characteristic of the reflected light corresponds to a crack characteristic.

In accordance with another aspect of the present disclosure, a system is provided. The system includes: a beam projector module comprising a light source and an optical device configured to diffuse light output from the light source to reduce an intensity of the light; an image sensor configured to receive reflected light formed by the light reflected from an object; and a signal processing device configured to measure a distance from the object by analyzing a characteristic of the reflected light, wherein the signal processing device operates the beam projector module in an eye-safety mode when a light intensity pattern of the reflected light in one area corresponds to a crack pattern.

In the system, when left and right light intensity of the reflected light in the one area are higher than a light intensity at the center, the signal processing device may determine that the light intensity pattern of the reflected light in the one area corresponds to a crack pattern.

In the system, when the light intensity pattern in the one area has a Gaussian distribution form, the signal processing device may determine that the light intensity pattern of the reflected light in the one area corresponds to a crack pattern.

In the system, when the light intensity of the reflected light measured in the one area is higher than the light intensity in the one area expected according to a distance measurement value in the one area measured by the reflected light by a predetermined reference or more, the signal processing device may determine that the light intensity pattern of the reflected light in the one area corresponds to a crack pattern.

In the system, when a distance measurement value pattern in the one area is different from the light intensity pattern, the signal processing device may determine that the light intensity pattern of the reflected light in the one area corresponds to a crack pattern.

As described above, according to the present embodiment, it is possible to safely protect a user's eyes even though the beam projector module has a fault.

BRIEF DESCRIPTION OF THE DRAWINGS

The above and other aspects, features and advantages of the present disclosure will be more apparent from the following detailed description taken in conjunction with the accompanying drawings, in which:

FIG. 17 illustrates examples of the crack pattern which may appear in the image light;

DETAILED DESCRIPTION

Figure 1:
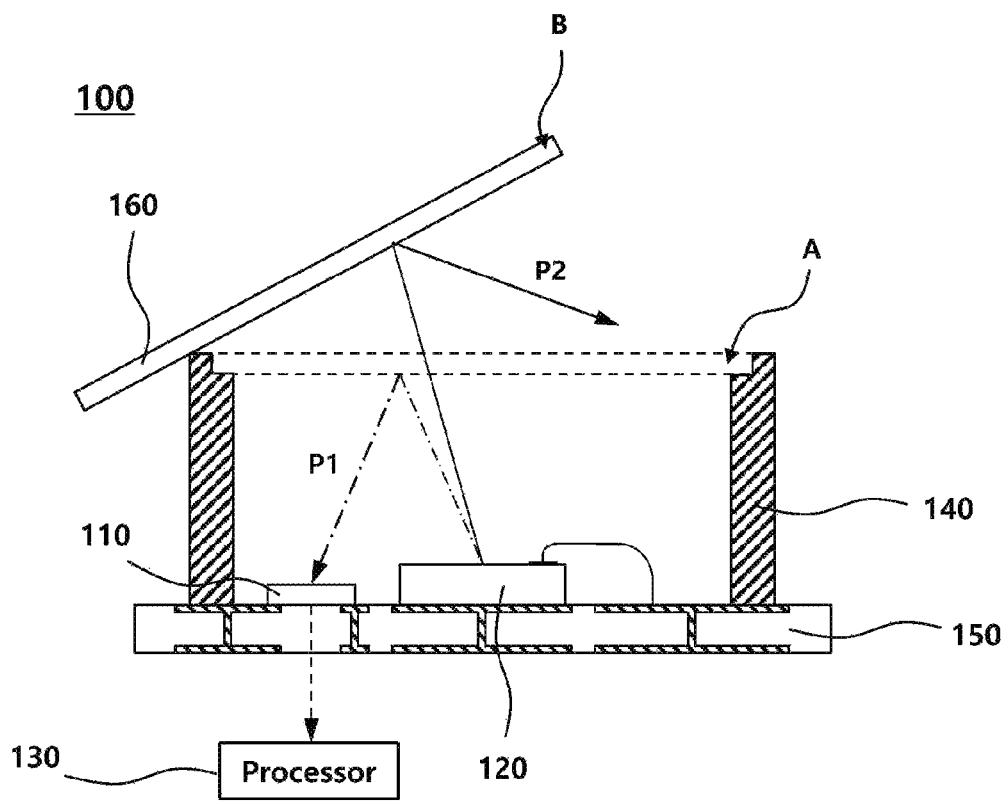
FIG. 1 illustrates a normal operation of a beam projector module.

Hereinafter, some embodiments of the present invention will be described in detail with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Three-dimensional distance measurement systems for measuring a distance from an object may include a beam projector module, an image sensor, and a signal processing device. The beam projector module may include a device for converting electrical energy into light and output light controlled according to electrical energy. Light output from the beam projector module may be input into an image sensor after being reflected from an object. The image sensor may include a device for converting light into an electrical signal and output light incident after being reflected from an object into an electrical signal. The signal processing device may calculate a distance from the object by analyzing the electrical signal generated by the image sensor.

The three-dimensional distance measurement systems may adopt a structure light scheme, a Time-of-Flight (ToF)

scheme, or other schemes which are not mentioned herein. In the structure light scheme, the beam projector module may output structure light having a predetermined pattern to an object and the signal processing device may calculate a distance from the object by analyzing deformation of the pattern through an electrical signal received through the image sensor. In the ToF scheme, the beam projector module may output pulse-shaped light (pulse light) to the object while repeating driving and non-driving. The signal processing device may calculate the distance from the object by measuring a phase shift of the pulse light through the electrical signal received through the image sensor.

In this specification, an embodiment of the beam projector module of the three-dimensional distance measurement system will be described. In this specification, an example of applying the structure light scheme or the ToF scheme to the beam projector module will be described, but the present disclosure is not limited thereto.

First Embodiment: Method of Detecting Detachment of Optical Device (For Example, Diffuser)

FIG. 1 illustrates a normal operation of a beam projector module.

Referring to FIG. 1, a beam projector module 100 may include a light-receiving device 110, a light source 120, a processor 130, a frame 140, a substrate 150, and an optical device 160. The module is not limited to one physical package but includes respective elements physically separated. For example, the light-receiving device 110, the light source 120, the frame 140, the substrate 150, and the optical device 160 are configured as one package, and the processor 130 may be included in another package.

The light source 120 may be disposed on the substrate 150 and may output light in a direction of the optical device 160. The light source 120 may include Vertical-Cavity Surface-Emitting Laser (VCSEL). The light source 120 may be a laser light source. An intensity of the light output from the light source 120 may be larger than a preset reference intensity for eye protection.

The light source 120 may receive driving power from the substrate 150. A cathode electrode may be formed on the lower surface of the light source 120 and an anode electrode may be formed on the upper surface of the light source 120. The cathode electrode may have an area-contact on the substrate 150 and the anode electrode may have a line-contact on the substrate 150.

The optical device 160 may be spaced by a predetermined distance apart from the light source 120 by the frame 140. The frame 140 may block light output from the light source 120 in a side direction while surrounding the light source 120. A groove may be formed on the frame 140 to dispose the optical device 160 thereon. The optical device 160 may be attached to the groove of the frame 140 by an adhesive.

The optical device 160 may reduce an intensity of light output from the light source 120 to a predetermined space. The optical device 160 may be a diffuser. The diffuser may reduce an intensity of light output to a predetermined space by diffusing the light output from the light source 120.

The light-receiving device 110 may measure light. The light-receiving device 110 may measure an intensity of the light. The light-receiving device 110 may measure the intensity of light according to each wavelength band of light or measure the intensity of light of a particular band. The light-receiving device 110 may include a device for converting light into an electrical signal and may generate an electrical signal corresponding to the intensity of light through the device. The electrical signal may be transferred to the processor 130.

Most of the light (hereinafter, referred to as "first light") output from the light source 120 may pass through the optical device 160 and output to the outside but some thereof may be reflected from the optical device 160 and return to the inside.

If the light returned to the inside by the optical device 160 is second light, the processor 130 may measure the second light through the light-receiving device 110 and identify whether the optical device 160 is normally disposed.

Referring to FIG. 1, when the optical device 160 is at a normal location (A) while the light source 120 outputs the first light, the light-receiving device 110 may measure the second light. When the optical device 160 is at an abnormal location (B), the light-receiving device 110 cannot measure the second light and the processor 130 may perform an eye-safety function of the beam projector module 100 through such a phenomenon.

For example, when the optical device 160 is at the normal location (A), the first light output from the light source 120 may reach the light-receiving device 110 while moving along a first path (P1). The processor 130 may identify that the optical device 160 is disposed at the normal location (A) on the basis of an electrical signal received through the light-receiving device 110. However, when the optical device 160 is disposed at an abnormal location (B), the first light output from the light source 120 may not reach the light-receiving device 110 while moving along a second path (P2). The processor 130 may identify that an electrical signal is not received through the light-receiving device 110 and determine that the optical device 160 is disposed at the abnormal location (B). Non-reception of the electrical signal may mean that the electrical signal having a preset intensity is not received.

When the optical device 160 escapes the normal location, the light output from the light source 120 may reach and damage a human's eyes while maintaining the intensity. When it is determined that the optical device 160 escapes the normal location, the processor 130 may prevent eyes from being damaged by blocking the output of the light from the light source 120. The processor 130 may control power supplied to the light source 120 through the substrate 150. When it is determined that the optical device 160 escapes the normal location, the processor 130 may block power supplied to the light source 120 through the substrate 150.

Meanwhile, when the intensity of the light measured by the light-receiving device 110 is higher than a reference intensity, the processor 130 may determine that reflection from the optical device 160 is normally performed and the optical device 160 is disposed at the normal location. However, the determination may be a cause of a malfunction when there is external light.

Figure 2:
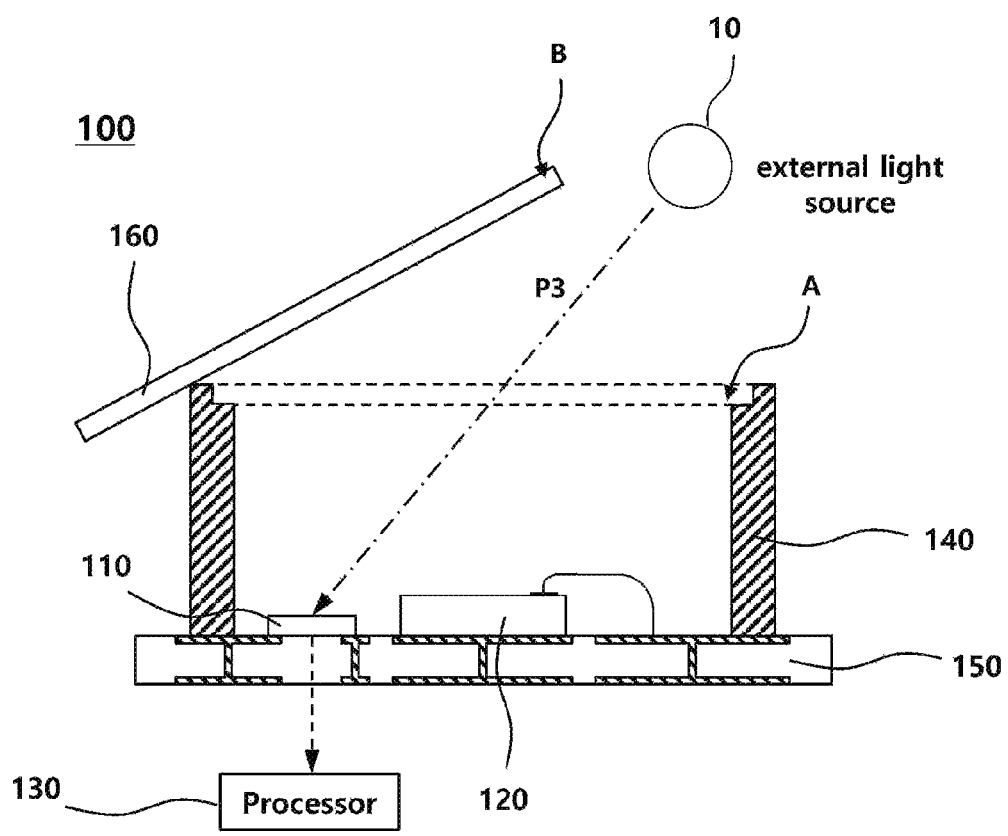
FIG. 2 illustrates an abnormal operation of the beam projector module.

FIG. 2 illustrates an abnormal operation of the beam projector module.

Referring to FIG. 2, although the optical device 160 escapes the normal location (A) and is at the abnormal location (B), the processor 130 may be influenced by the external light (hereinafter, referred to as "third light") output from an external light source 10 and determine that light having an intensity higher than or equal to the reference intensity is normally reflected from the optical device 160.

For example, in the state in which the optical device 160 is at the abnormal location (B), the third light output from the external light source 10 may flow into a gap between the optical device 160 and the frame 140 along a third path (P3)

illustrated in FIG. 2. At this time, the light-receiving device 110 may convert the third light into an electrical signal. If the processor 130 recognizes the electrical signal as the second light reflected from the optical device 160 by mistake, the eye-safety function described with reference to FIG. 1 is not normally operated.

In such a situation, when the processor 130 outputs the first light by continuously controlling the light source 120 without performing the eye-safety function, the beam projector module 100 may be a cause of damage to a user's eyes.

Methods of preventing a malfunction of the processor 130 will be described with reference to FIGS. 3 to 8.

A first method of preventing an abnormal operation of the beam projector module according to the first embodiment is a method of distinguishing a driving section and a non-driving section of the first light and analyzing the intensity of light measured by the light-receiving device in each section.

In the first method, the light source may output the first light in the driving section and block the output of the first light in the non-driving section. The operation of the light source is mainly performed in the ToF scheme, but the present disclosure is not limited thereto, and the ToF scheme may correspond to the case in which the light source controls light separately in a driving section and a non-direction section.

With respect to the first light, the optical device may reduce the intensity of light output to a predetermined space. The light-receiving device may measure the intensity of the second light of which the path is changed by the optical device in the first light.

When the intensity (first light intensity) of light measured by the light-receiving device in the driving section corresponds to a preset first abnormal range, the processor may perform the eye-safety function.

Meanwhile, when the intensity (first light intensity) of light measured by the light-receiving device in the driving section corresponds to a preset first normal range, the processor may determine whether to perform the eye-safety function by additionally analyzing the intensity (second light intensity) of light measured by the light-receiving device in the non-driving section.

For example, when the first light intensity corresponds to the preset first normal range but the second light intensity corresponds to the preset second abnormal range, the processor may perform the eye-safety function.

For example, the first abnormal range is a range in which the intensity of light is lower than a preset reference intensity, the first normal range is a range in which the intensity of light is higher than the reference intensity, and the second abnormal range is a range in which the intensity of light is higher than the reference intensity.

In another example, the first abnormal range is a range in which the intensity of light is lower than a preset first abnormal intensity and the first normal range is a range in which the intensity of light is higher than a preset first normal intensity. The first abnormal intensity may be lower than the first normal intensity, and the second abnormal intensity may be higher than the first abnormal intensity and lower than the first normal intensity.

Figure 3:
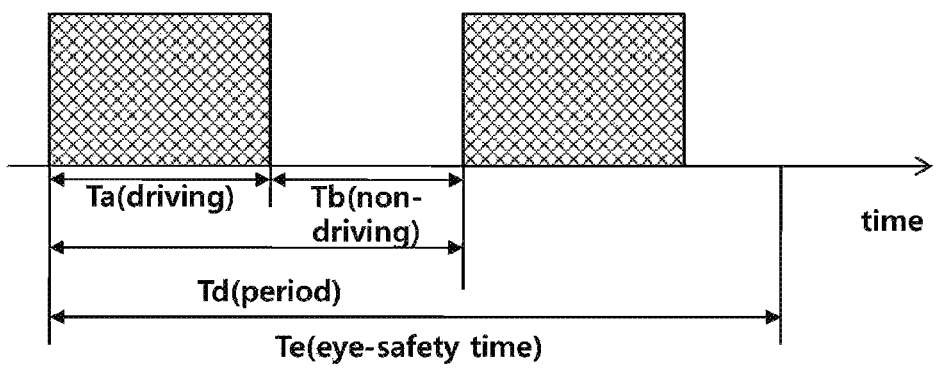
FIG. 3 illustrates a driving section and a non-driving section of light in a first method of preventing the beam projector module from abnormally operating according to a first embodiment.

FIG. 3 illustrates the driving section and the non-driving section of light in the first method of preventing the beam projector module from abnormally operating according to the first embodiment.

Referring to FIG. 3, the light source may output the first light in the driving section (Ta) and block the output of the first light in the non-driving section (Tb). The driving section (Ta) and the non-driving section (Tb) may be repeated according to a predetermined period (Td).

When the intensity (first light intensity) of light measured by the light-receiving device in the driving section (Ta) corresponds to a preset first abnormal range, the processor may perform the eye-safety function. The eye-safety function may include blocking the output of the light source.

Meanwhile, although the first light intensity corresponds to the preset first normal range, if the intensity (second light intensity) of light measured in the non-driving section (Tb) corresponds to the preset second abnormal range, the processor may perform the eye-safety function.

Here, the number of reference intensities for distinguishing normal and abnormal may be one. Accordingly, the first abnormal range may be a range in which the intensity of light is lower than a preset reference intensity, the first normal range may be a range in which the intensity of light is higher than the reference intensity, and the second abnormal range may be a range in which the intensity of light is higher than the reference intensity.

In another example, reference intensities for distinguishing the ranges may be different. For example, the first abnormal range may be a range in which the intensity of light is lower than a preset first abnormal range, the first normal range may be range in which the intensity of light is higher than a preset first normal intensity, and the second abnormal range may be a range in which the intensity of light is higher than a preset second abnormal intensity. The first abnormal intensity may be lower than the first normal intensity, and the second abnormal intensity may be higher than the first abnormal intensity and lower than the first normal intensity.

A time generated by adding the driving section (Ta) and the non-driving section (Tb) may be shorter than a predefined eye-safety operation time (Te). According to such settings, the processor may determine whether to perform the eye-safety function within a time shorter than the eye-safety operation time (Te).

In another aspect, the period (Td) including the driving section (Ta) and the non-driving section (Tb) may be shorter than the eye-safety operation time (Te). According to such settings, the processor may determine whether to perform the eye-safety function within a time shorter than the eye-safety operation time (Te).

Figure 4:
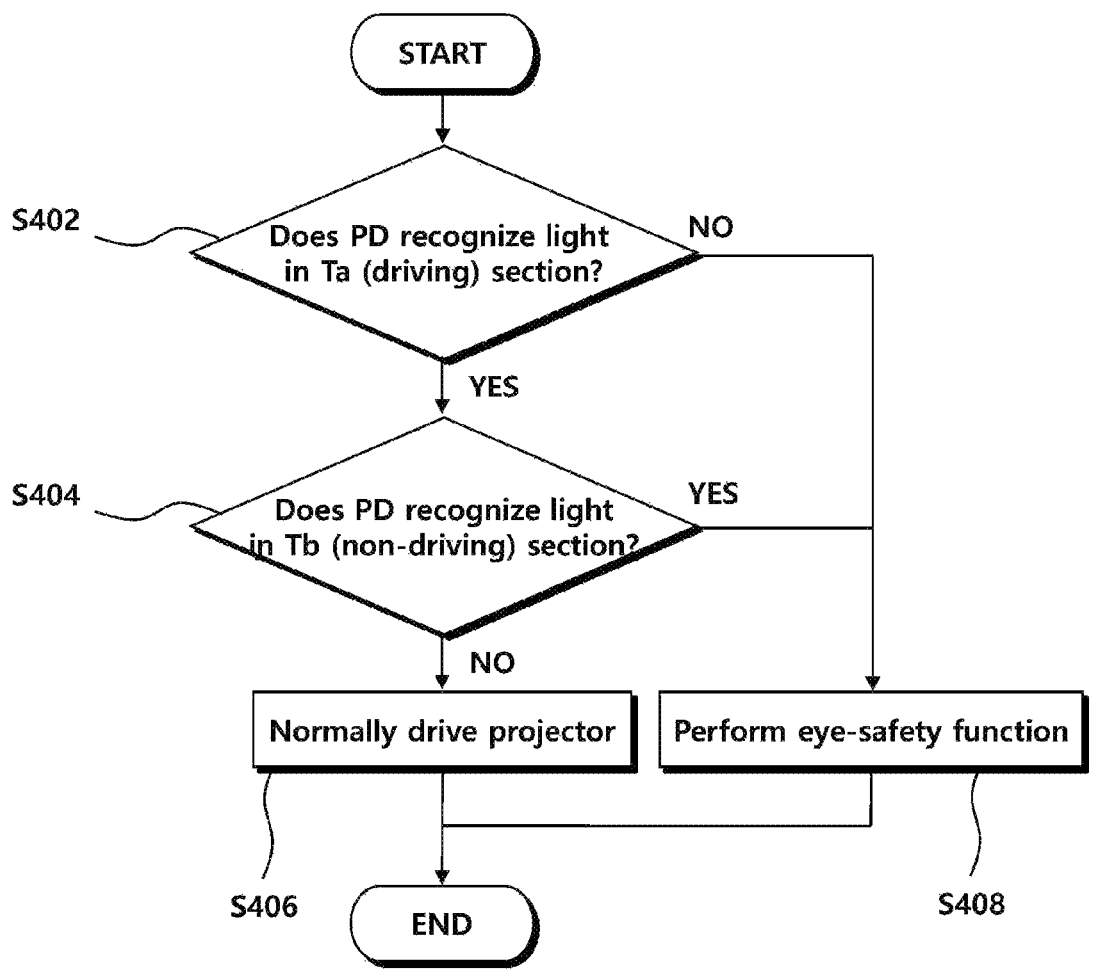
FIG. 4 is a flowchart illustrating the first method of preventing the abnormal operation of the beam projector module according to the first embodiment.

FIG. 4 is a flowchart illustrating the first method of preventing the abnormal operation of the beam projector module according to the first embodiment.

Referring to FIG. 4, the processor may output the first light by controlling the light source in the driving section and compare the intensity (first light intensity) of light measured by the light-receiving device in the driving section with a first reference intensity in S402.

When the first light intensity is lower than a first reference intensity (No of S402), the processor may perform the eye-safety function in S408.

The processor may block the output of the first light by controlling the light source in the non-driving section and compare the intensity (second light intensity) of light measured by the light-receiving device in the non-driving section with a second reference intensity in S404.

When the first light intensity is higher than the first reference intensity and the second light intensity is higher than the second reference intensity (Yes of S404), the processor may perform the eye-safety function in S408.

When the first light intensity is higher than the first reference intensity and the second intensity is lower than the second reference intensity (No of S404), the processor may drive the beam projector module in a normal mode in S406.

Meanwhile, in the second method, the light source may output the first light having a predetermined waveform, and the processor may analyze a waveform of light measured by the light-receiving device and determine whether to perform the eye-safety function. For example, when the intensity of light measured by the light-receiving device corresponds to a preset first normal range but the waveform of light measured by the light-receiving device is different from the waveform of the first light, the processor may perform the eye-safety function.

Figure 5:
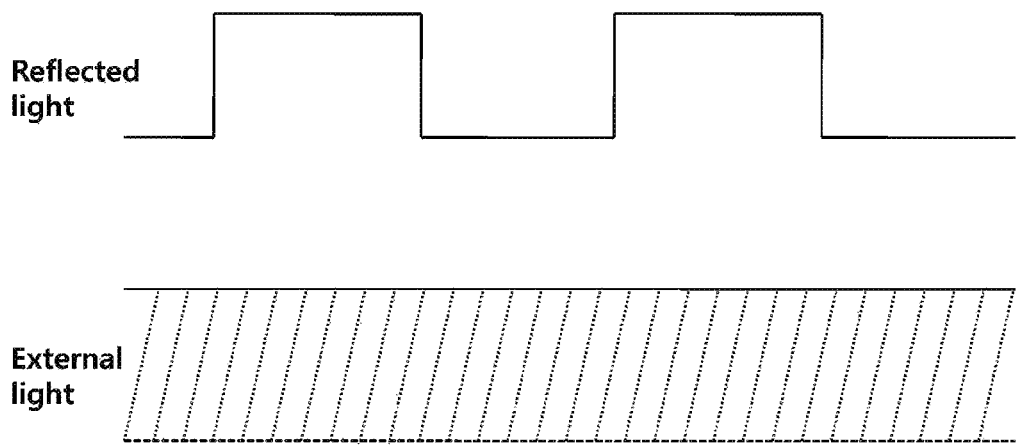
FIG. 5 illustrates waveforms of reflected light and external light in a second method of preventing the abnormal operation of the beam projector module according to the first embodiment.

FIG. 5 illustrates waveforms of reflected light and external light in the second method of preventing the abnormal operation of the beam projector module according to the first embodiment.

Referring to FIG. 5, the light source may output the first light having a predetermined waveform. Hereinafter, the waveform of light output from the light source is referred to as a first waveform.

The processor may determine similarity between the waveform (hereinafter, referred to as a "second waveform") measured by the light-receiving device and the first waveform. Although the intensity of light measured by the light-receiving device is higher than the reference intensity, the processor may perform the eye-safety function if the similarity between the second waveform and the first waveform is equal to or smaller than a predetermined value.

The processor may compare periods between the first waveform and the second waveform to determine the similarity therebetween and further compare a time of the driving section in which the intensity of light is relatively high during the period and a time of the non-driving section in which the intensity of light is relatively lower than the driving section to determine the similarity therebetween.

In another example, the processor may compare frequencies of the first waveform and the second waveform to determine the similarity therebetween. Alternatively, the processor may compare duties of the first waveform and the second waveform to determine the similarity. The duty refers to a ratio of the driving section to the period.

Figure 6:
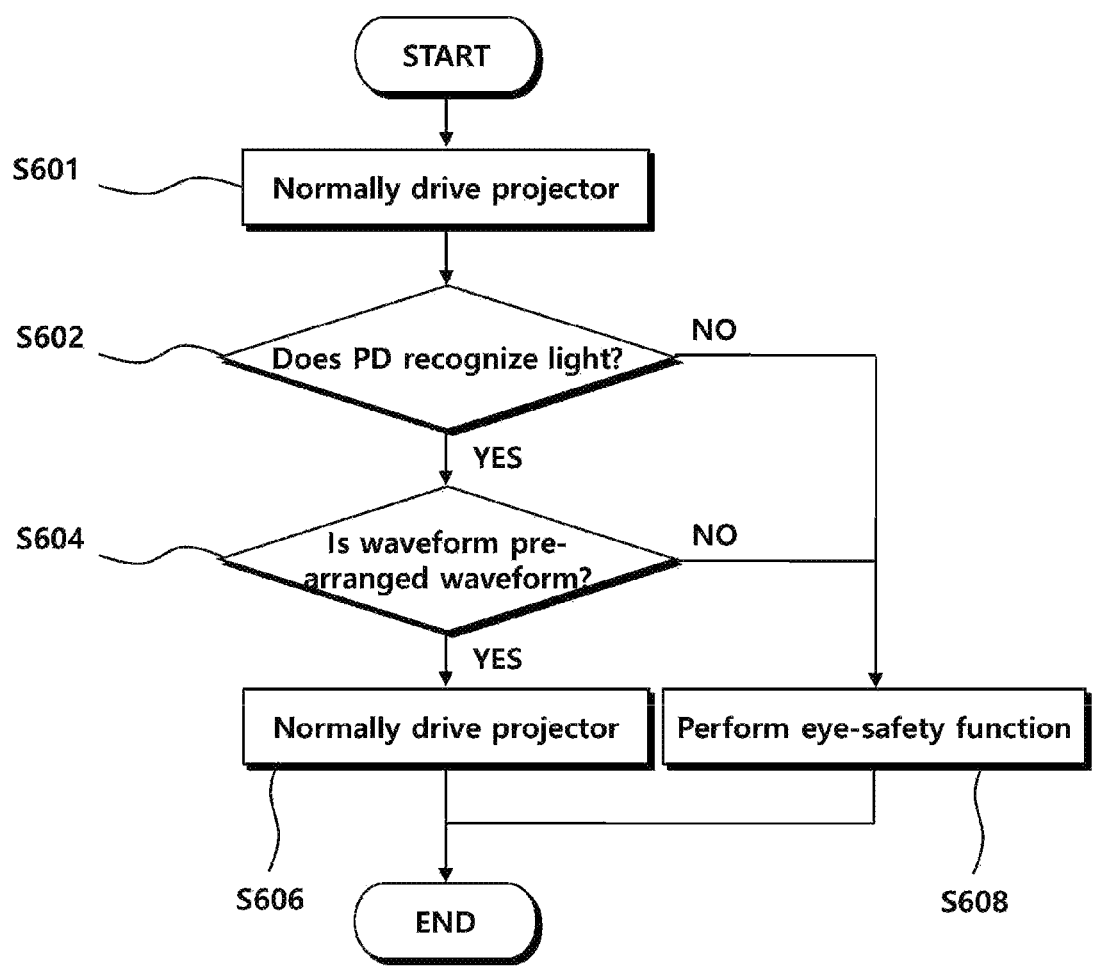
FIG. 6 is a flowchart illustrating the second method of preventing the abnormal operation of the beam projector module according to the first embodiment.

FIG. 6 is a flowchart illustrating the second method of preventing the abnormal operation of the beam projector module according to the first embodiment.

Referring to FIG. 6, the processor may output the first light having the first waveform by controlling the light source in S601.

The processor may compare the intensity (first light intensity) of light measured by the light-receiving device with the first reference intensity in S602.

When the first light intensity is lower than the first reference intensity (No of S602), the processor may perform the eye-safety function in S608.

The processor may determine the similarity between the first waveform and the waveform (second waveform) of light measured by the light-receiving device in S604.

When it is determined that the first light intensity is higher than the first reference intensity and the similarity between the first waveform and the second waveform is equal to or smaller than a predetermined value (No of S604), the processor may perform the eye-safety function in S608. Otherwise, the processor may drive the beam projector module in the normal mode in S606.

Meanwhile, in the third method, the light source may output the first light having a waveform of a particular wavelength band. When it is determined that the similarity between the wavelength band of light measured by the light-receiving device and the wavelength band of the first light is equal to or smaller than a predetermined value, the processor may perform the eye-safety function.

Figure 7:
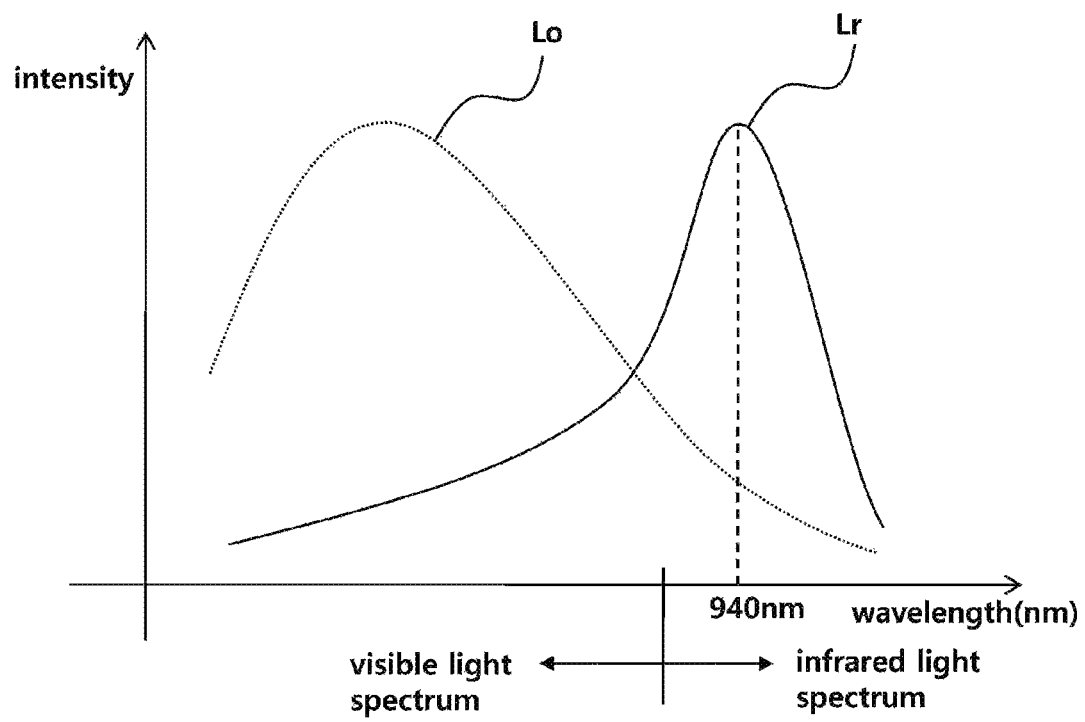
FIG. 7 illustrates wavelength bands of reflected light and external light in a third method of preventing the abnormal operation of the beam projector module according to the first embodiment.

FIG. 7 illustrates wavelength bands of reflected light and external light in the third method of preventing the abnormal operation of the beam projector module according to the first embodiment.

Referring to FIG. 7, the light source may output the first light having a predetermined wavelength band. Hereinafter, the wavelength band of the light output from the light source is referred to as a first wavelength band.

The processor may determine the similarity between the wavelength band (hereinafter, referred to as a "second wavelength band") of light measured by the light-receiving device and the first waveform bandwidth. Although the intensity of light measured by the light-receiving device is higher than the reference intensity, the processor may perform the eye-safety function if it is determined that the similarity between the second wavelength band and the first wavelength band is equal to or smaller than a predetermined value.

Figure 8:
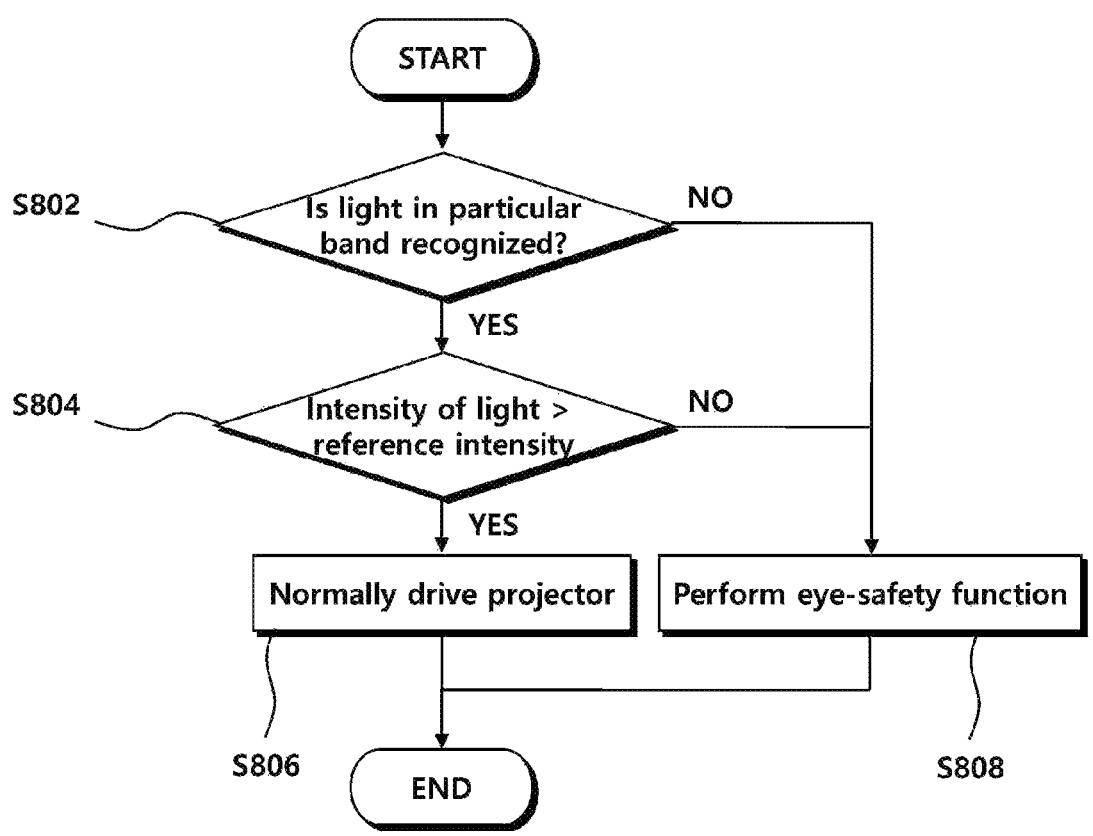
FIG. 8 is a flowchart illustrating the third method of preventing the abnormal operation of the beam projector module according to the first embodiment.

FIG. 8 is a flowchart illustrating the third method of preventing the abnormal operation of the beam projector module according to the first embodiment.

Referring to FIG. 8, the processor may output the first light having the waveform of the first wavelength band by controlling the light source.

The processor may compare the wavelength band (second wavelength band) of light measured by the light-receiving device and the first wavelength band in S802.

When the similarity between the second wavelength band and the first wavelength band is smaller than a predetermined value (No of S802), the processor may perform the eye-safety function in S808.

The processor may compare the intensity (first light intensity) of light measured by the light-receiving device with the first reference intensity in S804.

When the similarity between the second wavelength band and the first wavelength band is larger than the predetermined value and the first light intensity is smaller than the first reference intensity (No of S804), the processor may perform the eye-safety function in S808. Otherwise, the processor may drive the beam projector module in a normal mode in S806.

According to the first embodiment as described above, there are technologies for the beam projector module including the eye-safety function and an effect of preventing a malfunction of the eye-safety function.

Although the first method, the second method, and the third method have been distinguished from each other, a combination thereof may be used. For example, in a method of combining the second method and the third method, the processor may determine whether to perform the eye-safety function by analyzing both a waveform and a wavelength of the first light. In another example, the processor may use a combination of the first method and the second method or a combination of the first method and the third method. Further, the processor may use a combination of all of the methods.

Second Embodiment: Method 1 of Detecting Crack of Optical Device (For Example, Diffuser)

Figure 9:
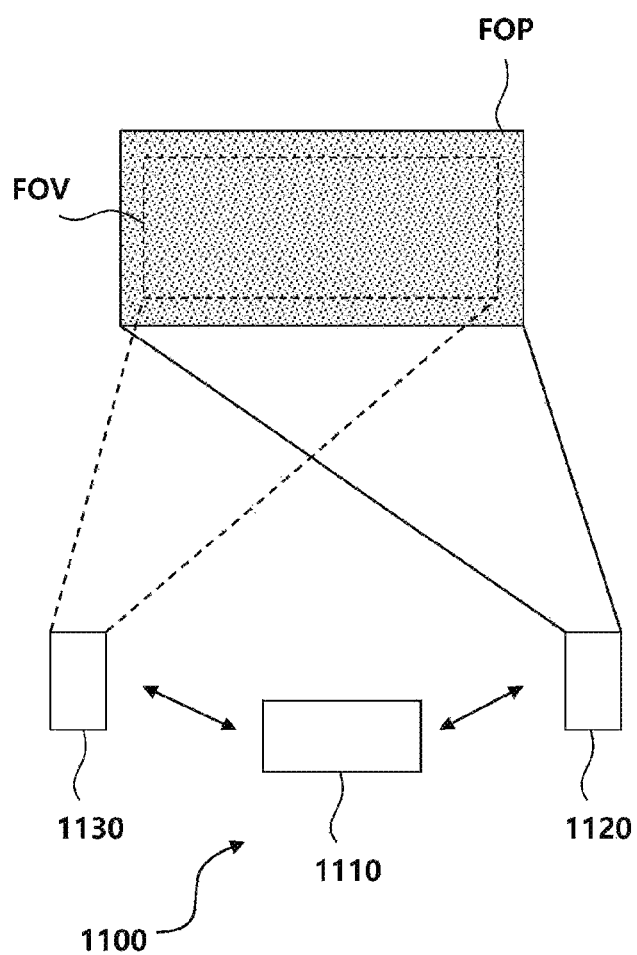
FIG. 9 illustrates the configuration of a system according to the second embodiment.

FIG. 9 illustrates the configuration of a system according to the second embodiment.

Referring to FIG. 9, a system 1100 for measuring a distance from an object may include a beam projector module 1120, an image sensor 1130, and a signal processing device 1110.

The beam projector module 1120 may include a device for converting electrical energy into light and may output light controlled according to electrical energy to a predetermined area (Field Of Projection (FOP)). The light output from the beam projector module 1120 may be input into the image sensor 1130 after being reflected from the object. The image sensor 1130 may include a device for converting light input from the predetermined area (Field Of View (FOV)) into an electrical signal and may convert light incident after being reflected from the object into an electrical signal. The signal processing device 1110 may calculating a distance from the object by analyzing the electrical signal generated by the image sensor 1130.

The systems 1100 may adopt a structure light scheme, a Time-of-Flight (ToF) scheme, or other schemes which are not mentioned herein. In the structure light scheme, the beam projector module 1120 may output structure light having a predetermined pattern to the object and the signal processing device 1110 may calculate a distance from the object by analyzing deformation of the pattern through an electrical signal received through the image sensor 1130. In the ToF scheme, the beam projector module 1120 may output pulse-shaped light (pulse light) to the object while repeating driving and non-driving. The signal processing device 1110 may calculate the distance from the object by measuring a phase change of the pulse light on the basis of the electrical signal received through the image sensor 1130.

In this specification, an example of applying the structure light scheme or the ToF scheme to the beam projector module 1120 is described, but the present disclosure is not limited thereto.

The beam projector module 1120 may include a light source and an optical device for diffusing light output from the light source and reducing an intensity of the light. The image sensor 1130 may receive reflected light formed by light reflected from the object. The signal processing device 1110 may measure the distance from the object by analyzing a characteristic of the reflected light.

Meanwhile, when the characteristic of the reflected light corresponds to a crack characteristic, the signal processing device 1110 may operate the beam projector module 1120 in an eye-safety mode.

Figure 10:
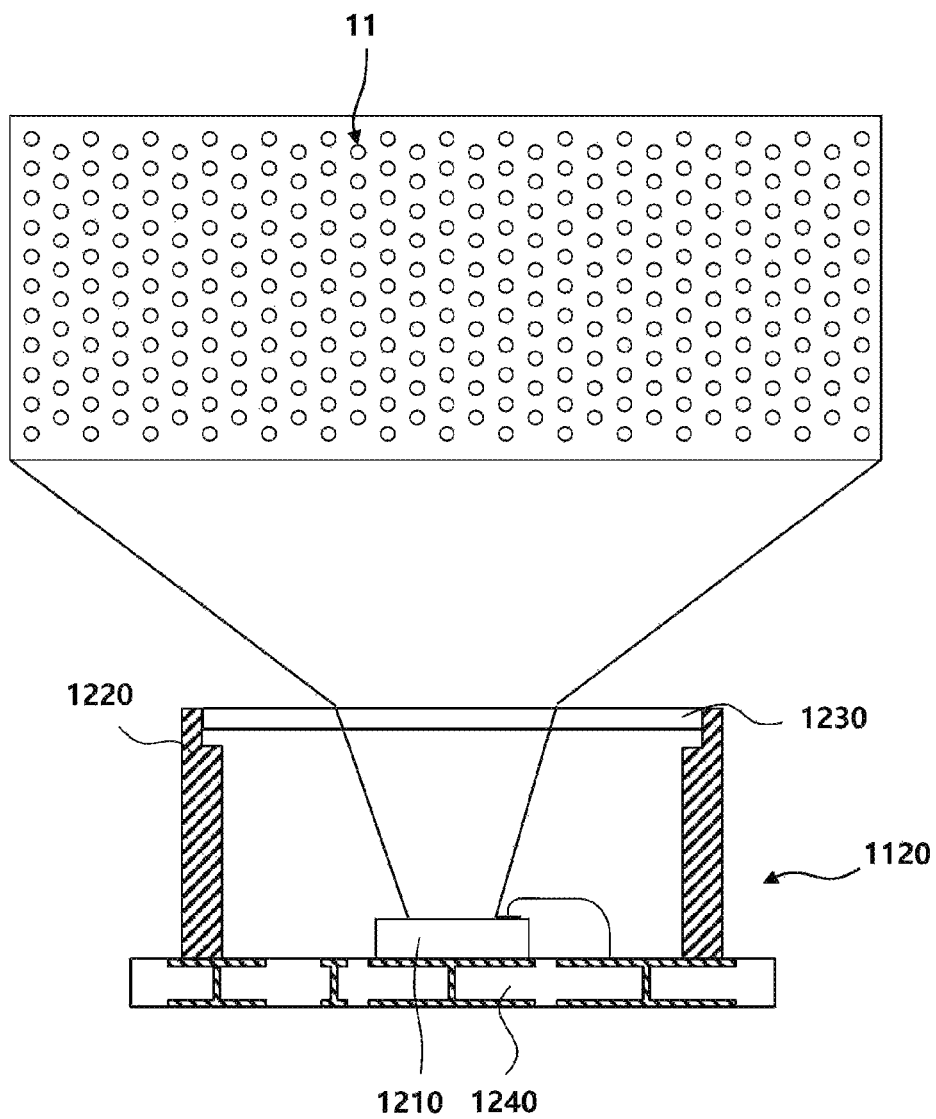
FIG. 10 illustrates a pattern of image light in the case in which the beam projector module is in a normal state.
Figure 11:
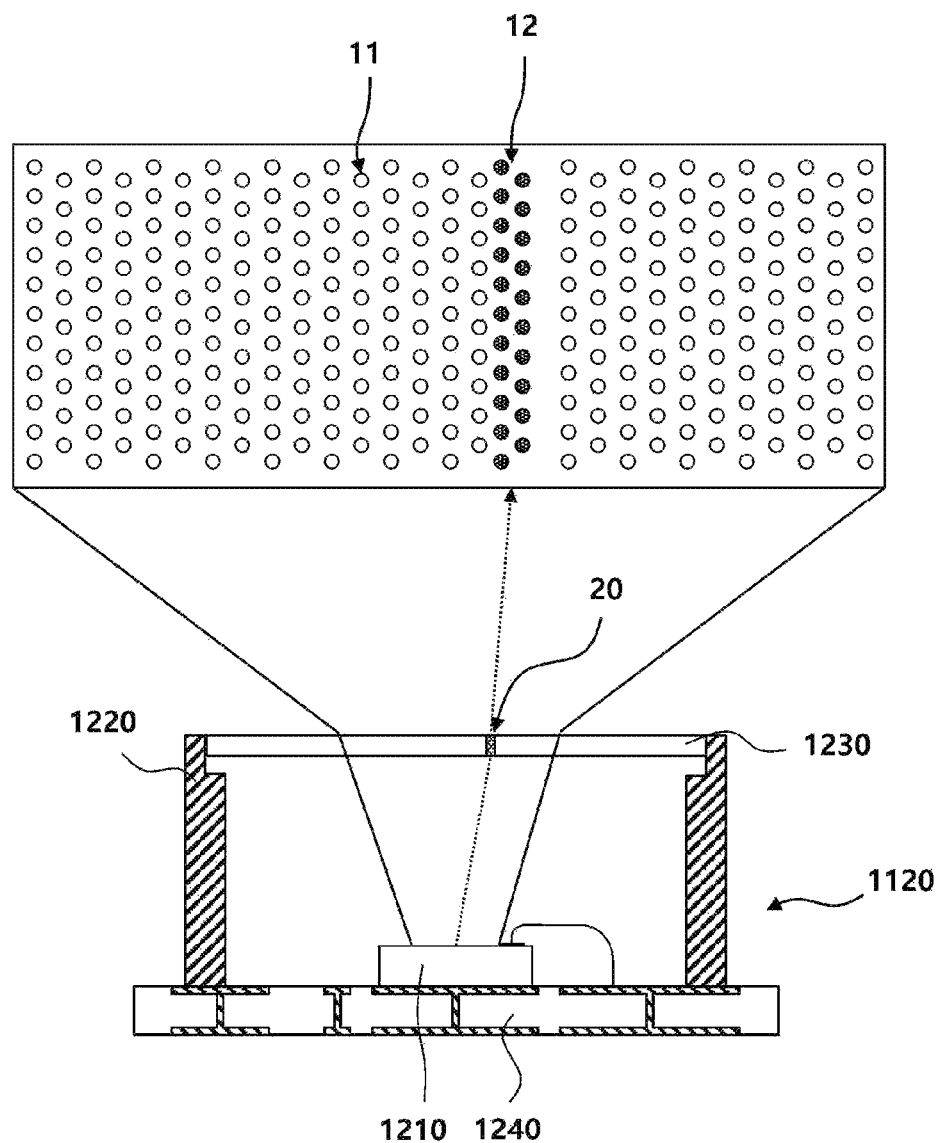
FIG. 11 illustrates a pattern of image light in the case in which the beam projector module is in a cracked state.

FIG. 10 illustrates a pattern of image light in the case in which the beam projector module is in a normal state, and FIG. 11 illustrates a pattern of image light in the case in which the beam projector module is in a cracked state.

The beam projector module 1120 may include a light source 1210, a frame 1220, an optical device 1230, and a substrate 1240.

The light source 1210 may be disposed on the substrate 1240 and may output light in a direction of the optical device 1230. The light source 1210 may include Vertical-Cavity Surface-Emitting Laser (VCSEL). The light source 1210 may be a laser light source. An intensity of the light output from the light source 1210 may be larger than a preset reference intensity for eye protection.

The light source 1210 may receive driving power from the substrate 1240. A cathode electrode may be formed on the lower surface of the light source 1210 and an anode electrode may be formed on the upper surface of the light source 1210. The cathode electrode may have an area-contact on the substrate 1240 and the anode electrode may have a line-contact on the substrate 1240.

The optical device 1230 may be spaced by a predetermined distance apart from the light source 1210 by the frame 1220. The frame 1220 may block light output from the light source 1210 in a side direction while surrounding the light source 1210. A groove may be formed on the frame 1220 to dispose the optical device 1230 thereon. The optical device 1230 may be attached to the groove of the frame 1220 by an adhesive.

The optical device 1230 may reduce an intensity of light output from the light source 1210 to a predetermined space. The optical device 1230 may be a diffuser. The diffuser may reduce an intensity of light output to a predetermined space by diffusing the light output from the light source 1210.

The light output from the light source 1210 may pass through the optical device 1230 and may be output to the outside. The light output from the light source 1210 may include a predetermined pattern 11. If the light projected on the object is image light, a plurality of dots may form a predetermined pattern 11 on the image light as illustrated in FIG. 10. The pattern 11 may be formed by the light source 1210 and copied by the optical device 1230. Alternatively, the pattern 11 may be formed by the optical device 1230.

Meanwhile, when the optical device 1230 is normal, the image light may be configured by the prearranged pattern 11 as illustrated in FIG. 11. However, when a crack 20 is formed on the optical device 1230, a crack pattern 12 generated by transforming part of the pattern 11 may be formed on the image light as illustrated in FIG. 11.

For example, when the crack is generated on the optical device 1230 in the beam projector module 1120 as illustrate din FIGS. 10 and 11, the partial pattern 11 of the projected image light may move to form the crack pattern 12.

Figure 12:
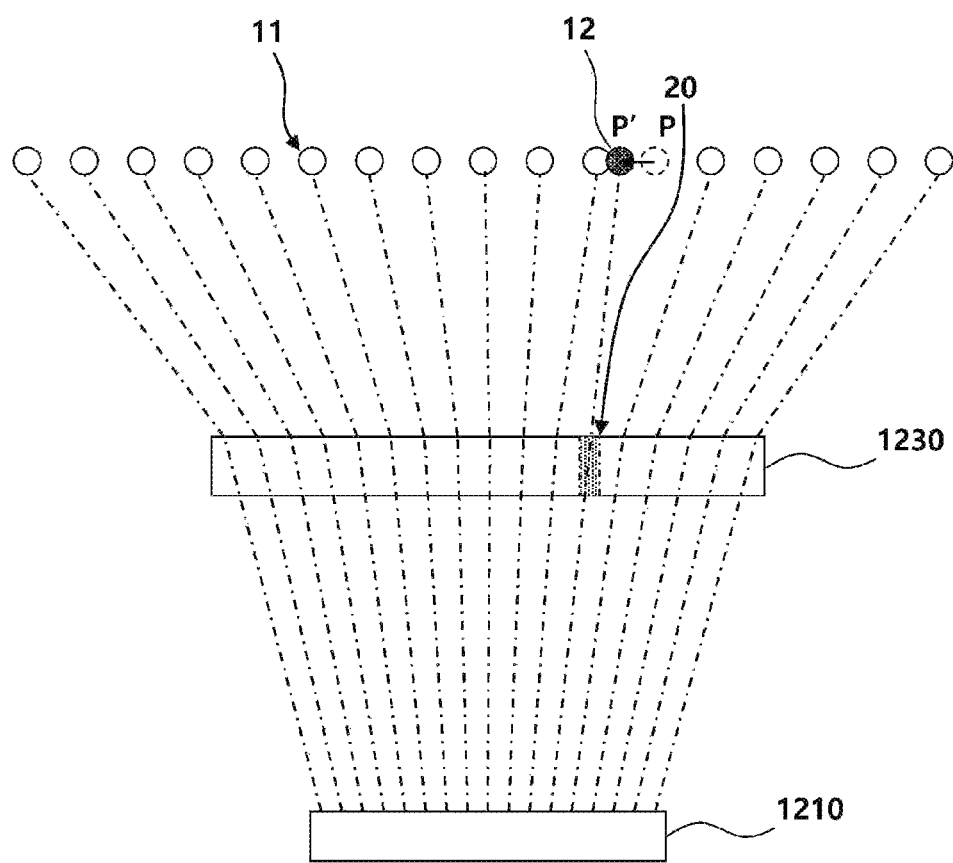
FIG. 12 illustrates an example of pattern movement in the case in which a crack is generated in an optical device.

FIG. 12 illustrates an example of pattern movement in the case in which the crack is generated on the optical device.

Referring to FIG. 12, the optical device 1230 may diffuse the light projected from the light source 1210, and when the crack 20 is generated on the optical device 1230, a path of the projected light may be abnormally refracted and thus the pattern 11 may move.

For example, when the optical device 1230 is normal, a dot should be formed at a first location (P), but the light passing through the crack 20 of the optical device 1230 may form a dot at a second location (P'), which is different from the first location (P) while being abnormally refracted. The part having transform by the crack 20 in the pattern 11 may be called the crack pattern 12.

Figure 13:
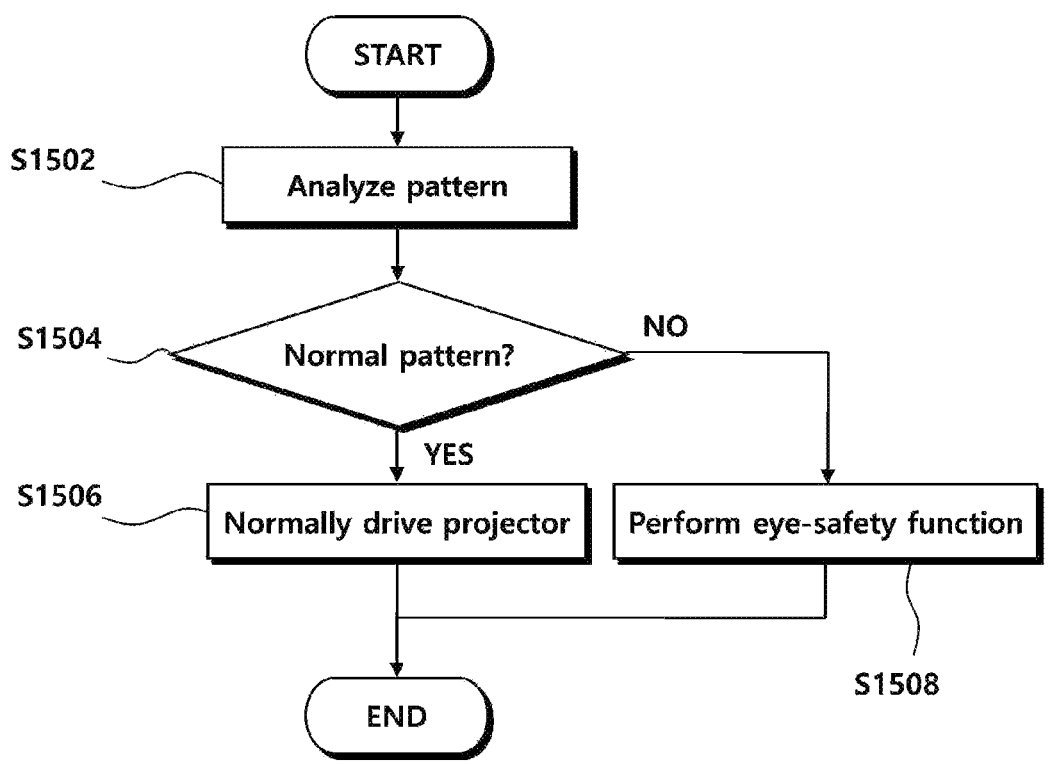
FIG. 13 is a flowchart illustrating a method of controlling a system according to the second embodiment.

FIG. 13 is a flowchart illustrating a method of controlling the system according to the second embodiment.

Referring to FIG. 13, the signal processing device may analyze a pattern of image light projected on the object in S1502.

When it is determined that the pattern is a normal pattern (Yes of S1504), the signal processing device may operate the beam projector module in a normal mode in S1506.

When it is determined that a crack pattern is included in the pattern (No of S1504), the signal processing device may operate the beam projector module in an eye-safety mode in S1508.

Meanwhile, the signal processing device may recognize deformation of the pattern to measure a distance from the object, and when deformation of a pattern in a predetermined area in which a change in the distance from the object is linearly formed is formed non-linearly, it may be determined that the crack pattern is included in the image light. The area in which the change in the distance from the object is linearly formed may be, for example, an area in which a planation surface is formed on the object. When the signal processing device measures the distance from the object through the image light formed on the planation surface, the distance linearly appears. Further, in the area of the planation surface, deformation of the pattern is also linear. However, when the signal processing device identifies non-linear deformation of the pattern in the area of the planation surface, it may be determined that the corresponding deformation is deformation by the crack.

Figure 14:
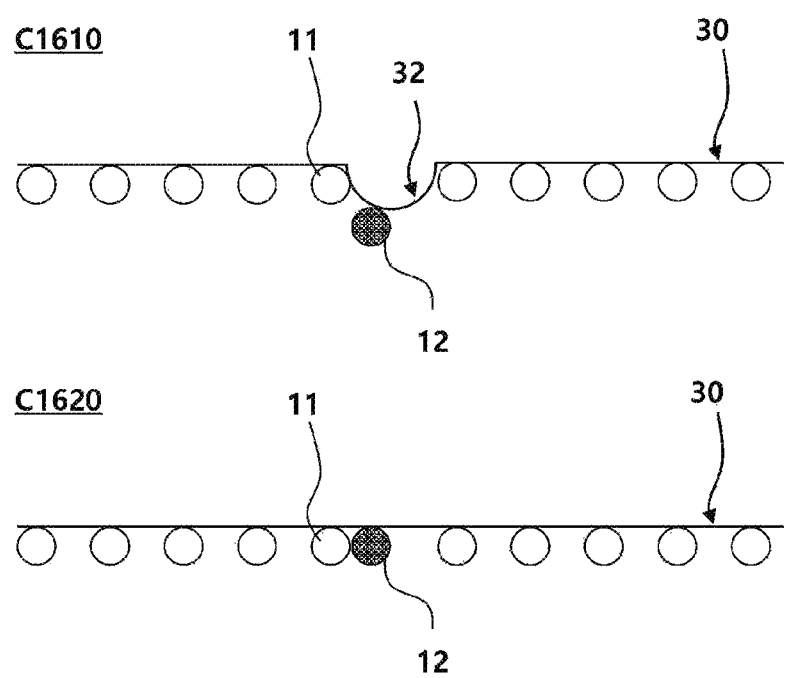
FIG. 14 illustrates pattern movement of the image light by a distance difference and pattern movement of the image light by the crack.

FIG. 14 illustrates pattern movement of the image light by a distance difference and pattern movement of the image light by the crack.

Referring to FIG. 14, when the object has a curve or there is a difference between distances of the object and a surrounding background, it may be identified that pattern movement similar to the pattern movement by the crack is generated in the image light.

A first case C1610 illustrated on the upper part of FIG. 14 is a case in which an object 30 has a curve 32, and a second case C1620 illustrated on the lower case of FIG. 14 is a case in which the object 30 has no crack but the crack pattern 12 is formed thereon by the crack of the optical device.

The first case C1610 and the second case C1620 may be different cases but the signal processing device may receive the same image light with respect to the two cases C1610 and C1620. The signal processing device may recognize deformation of the pattern 11 of the image light to measure the distance from the object. When the measured distance is abnormal, the signal processing device may determine that the beam projector module, for example, the optical device has a fault.

Meanwhile, in such a scheme, analysis of distinguishing the first case C1610 and the second case C1620 may be further added. For example, the signal processing device may compare image lights acquired at a plurality of different time points and distinguish the first case C1610 and the second case C1620 through whether the distance value estimated as the crack pattern 12 is repeatedly measured at the same location of each image light.

Figure 15:
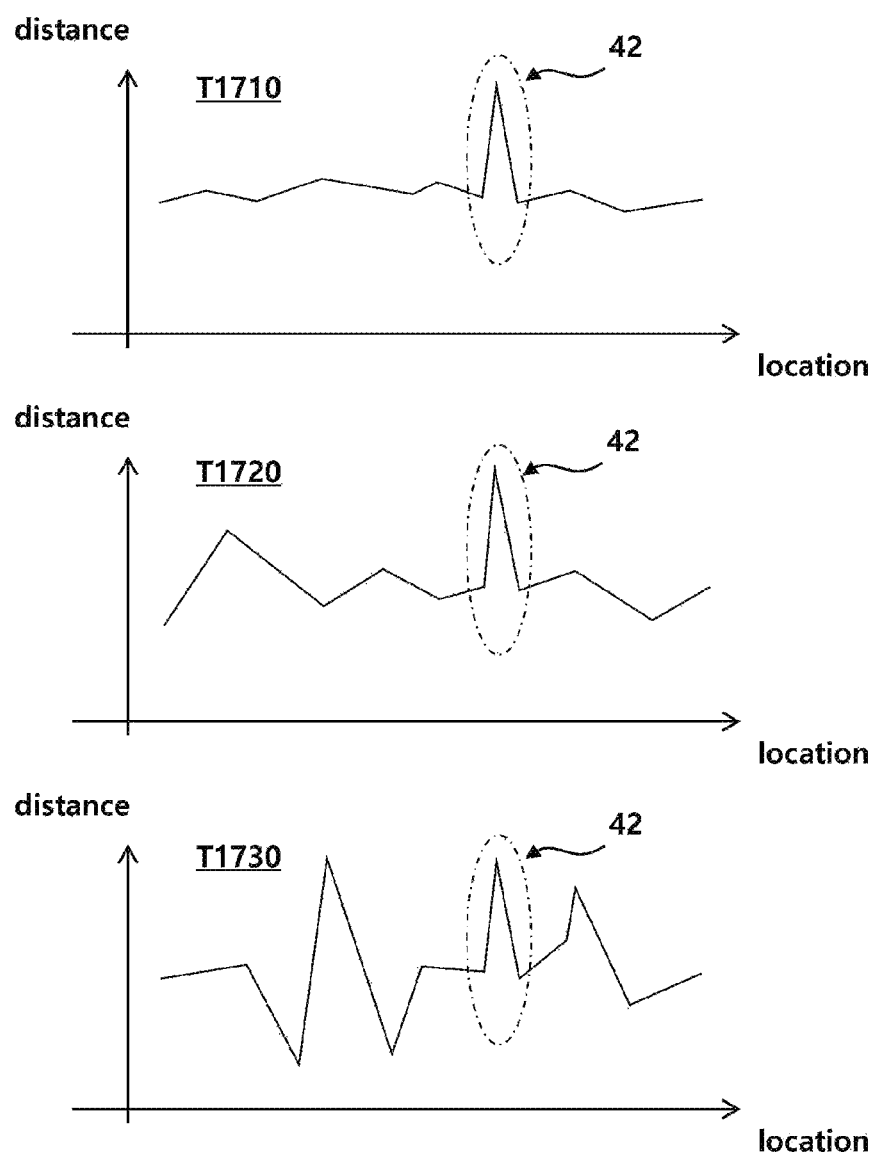
FIG. 15 illustrates a form of distance measurement vales of locations at a plurality of different time points in the case in which the beam projector module is in a cracked state.

FIG. 15 illustrates the form of a distance measurement value according to each location at a plurality of different time points when the beam projector module is in a cracked state.

Referring to FIG. 15, the signal processing device may measure the distance from the object by analyzing a pattern of image light, and when distance measurement value patterns or forms of pattern movement at a plurality of different time points at a predetermined location (area) are similar, it may be determined that the corresponding location (area) has a fault such as a crack.

For example, FIG. 15 illustrates a distance at each location at three different time points T1710, T1720, and T1730.

In the distance measurement value at the first time point T1710, it is noted that a distance value protrudes in one area (see reference numeral 42 of FIG. 15). The reason of the protrusion (see reference numeral 42 of FIG. 15) of the distance value may be that the protrusion is formed on the object like the first case of FIG. 14 or that the crack is formed on the optical device like the second case of FIG. 14. However, referring to FIG. 15, the protrusion (see reference numeral 42 of FIG. 15) of the same distance value is shown in the same area at the second time point T1720 and the third time point T1730. When it is recognized that deformation of the pattern in one area at the plurality of different time points has the same form, the signal processing device may determine that the beam projector module has a fault on the part corresponding to one area.

According to such a method, the signal processing device may indicate a location of the part having the fault in the beam projector module, for example, the optical device. The signal processing device may output location information to a host device including a User Interface (UI). Then, the user may identify the location of the part having the fault through the UI and easily perform additional work such as fixing or replacing.

The signal processing device may generate a three-dimensional image on the basis of the measured distance value. At this time, when it is recognized that the three-dimensional image in one area at a plurality of different time points has the same form, the signal processing device may determine that the beam projector module has a fault on the part corresponding to one area.

The signal processing device may correct the distance measurement value for the area having the fault.

Figure 16:
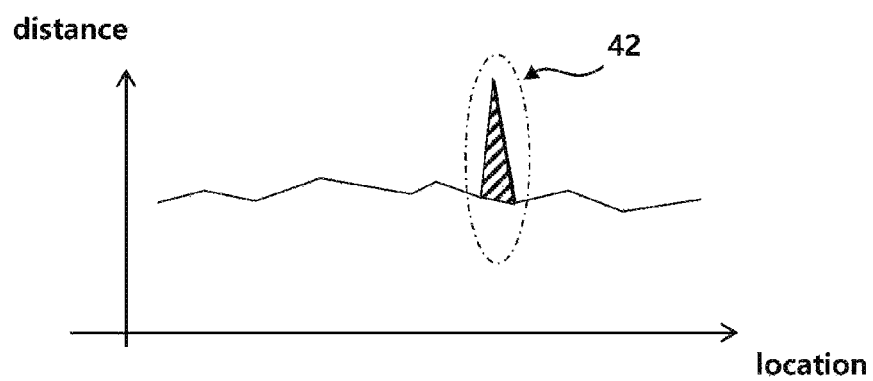
FIG. 16 illustrates correction of a crack pattern in the system according to the second embodiment.

FIG. 16 illustrates correction of the crack pattern in the system according to the second embodiment.

Referring to FIG. 16, the signal processing device may identify the distance measurement value 42 corresponding to the crack pattern and correct the distance measurement value 42. For example, the signal processing device may correct the distance measurement value 42 corresponding to the crack pattern by averaging distance measurement values in surrounding areas. Alternatively, the signal processing device may correct the distance measurement value 42 corresponding to the crack pattern through a fitting curve generated by the distance measurement values in the surrounding areas.

Meanwhile, the signal processing device may detect the crack pattern through a shape of deformation of the pattern.

FIG. 17 illustrates examples of the crack pattern which may appear in the image light.

Referring to FIG. 17, the crack pattern may have a concentric circle pattern in which an edge of a Field Of View (FOV) is continuously connected to another edge.

Referring to a first image light pattern P1910 illustrated on the upper part of FIG. 17, the pattern shown in the FOV is transformed to a concentric circle form 52. When deformation of the concentric circle form 52 is recognized in the pattern, the signal processing device may determine that the crack is generated at the center of the concentric circles in the optical device.

Referring to a second image light pattern P1920 illustrated on the lower part of FIG. 17, deformation 54 of the pattern in which an edge of the FOV is continuously connected to another edge. When the deformation 54 is recognized in the pattern, the signal processing device may determine that the crack is generated in the optical device.

Third Embodiment: Method 2 of Detecting Crack of Optical Device (For Example, Diffuser)

Figure 18:
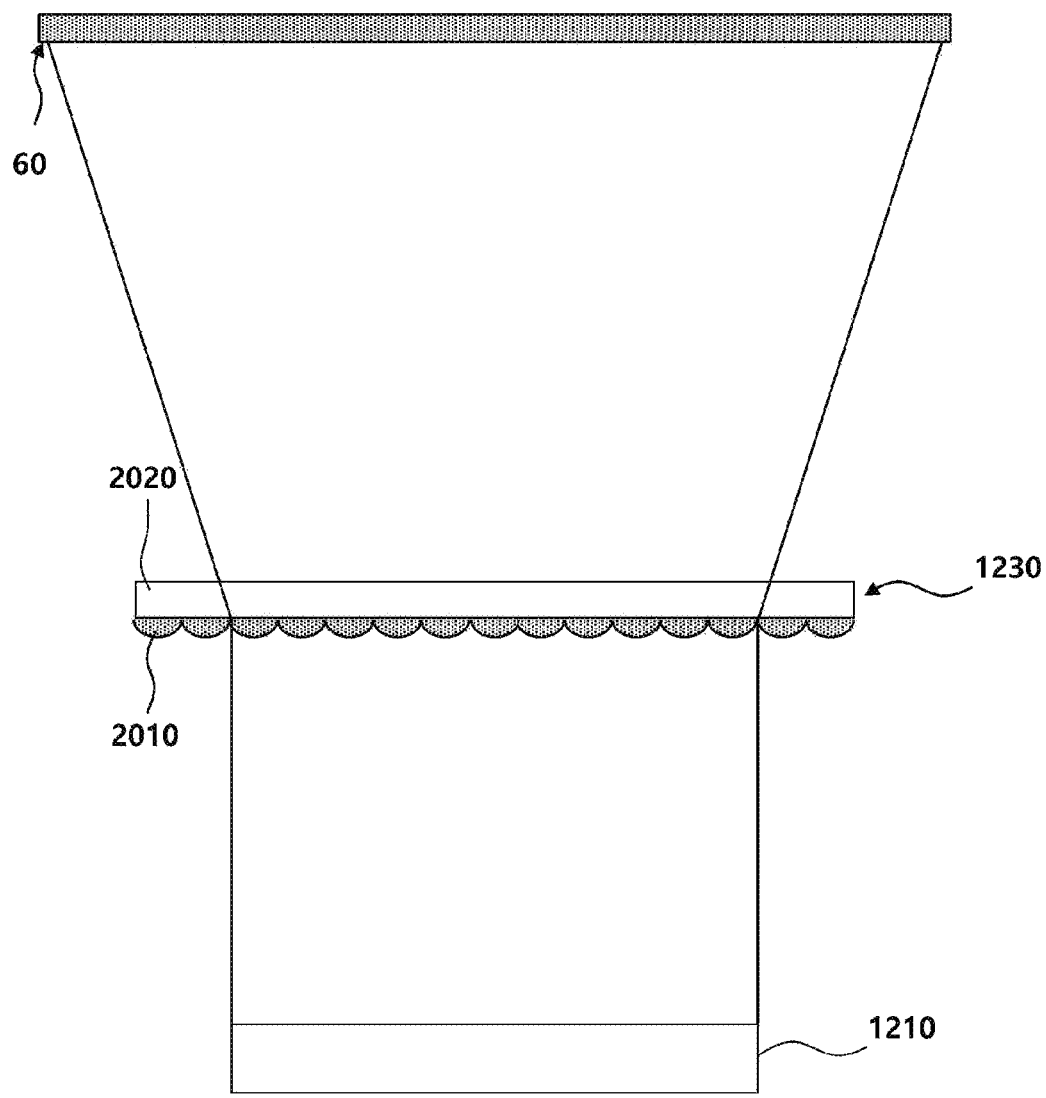
FIG. 18 illustrates normal projection of image light in the system according to a third embodiment.
Figure 19:
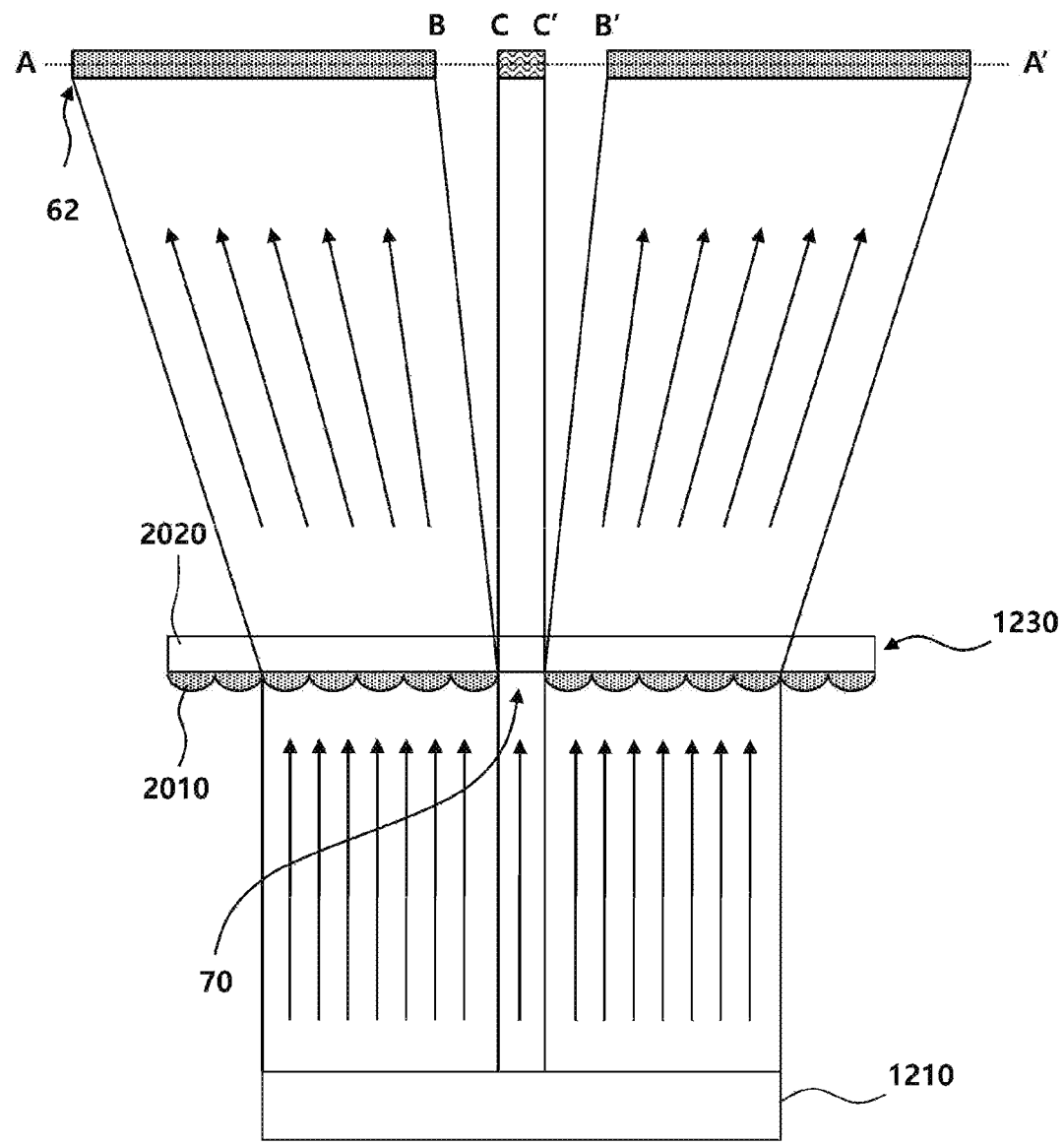
FIG. 19 illustrates abnormal projection of image light in the system according to the third embodiment.

FIG. 18 illustrates normal projection of image light in the system according to the third embodiment, and FIG. 19 illustrates abnormal projection of image light in the system according to the third embodiment.

Referring to FIGS. 18 and 19, the optical device 1230 may include a transparent substrate 2020 and a diffuser member 2010.

The diffuser member 2010 may diffuse light output from the light source 1210 to reduce an intensity of the light.

The diffuser member 2010 may be formed on one surface of the transparent substrate 2020. The diffuser member 2010 may be removed from the transparent substrate 2020 or part thereof may be damaged by external force or heating.

When the diffuser member 2010 is normally attached to the transparent substrate 2020, the light output from the light source 1210 may be diffused by the diffuser member 2010 to form the normal image light 60.

On the other hand, when an opening 70 or crack is generated in the diffuser member 2010, an abnormal area (area from B to B') may be formed in image light 62 passing through the corresponding opening 70 or the crack and projected.

Referring to FIG. 19, light passing through the part to which the diffuser member 2010 is normally attached may be normally diffused by the diffuser member 2010. The light may be output with the reduced intensity by the diffuser member 2010. However, light passing through a part 70 to which the diffuser member 2010 is not normally attached is output while being not normally diffused. The light is output with the intensity which is not reduced, and the intensity of the light may be not suitable for eye protection.

In the intensity of light according to each location in the image light 62, the intensity of light in areas (A-B or B'-A') which the normally diffused light reaches may correspond to a range defined to be suitable for eye protection. Further, the intensity of the light may be an intensity of light enough to cause photoelectric transformation by the image sensor.

On the other hand, an area C-C' located at an extension line of the light source 1210 and the opening 70 in the image light 62 has a high light intensity since light which has not passed through the diffuser member 2010 directly reaches the area. Further, surrounding areas (area B-C and area C'-B') have a low light intensity since light does not directly reach the areas.

The signal processing device may detect a problem generated in the diffuser member 2010 by analyzing the characteristic of the image light 62.

Figure 20:
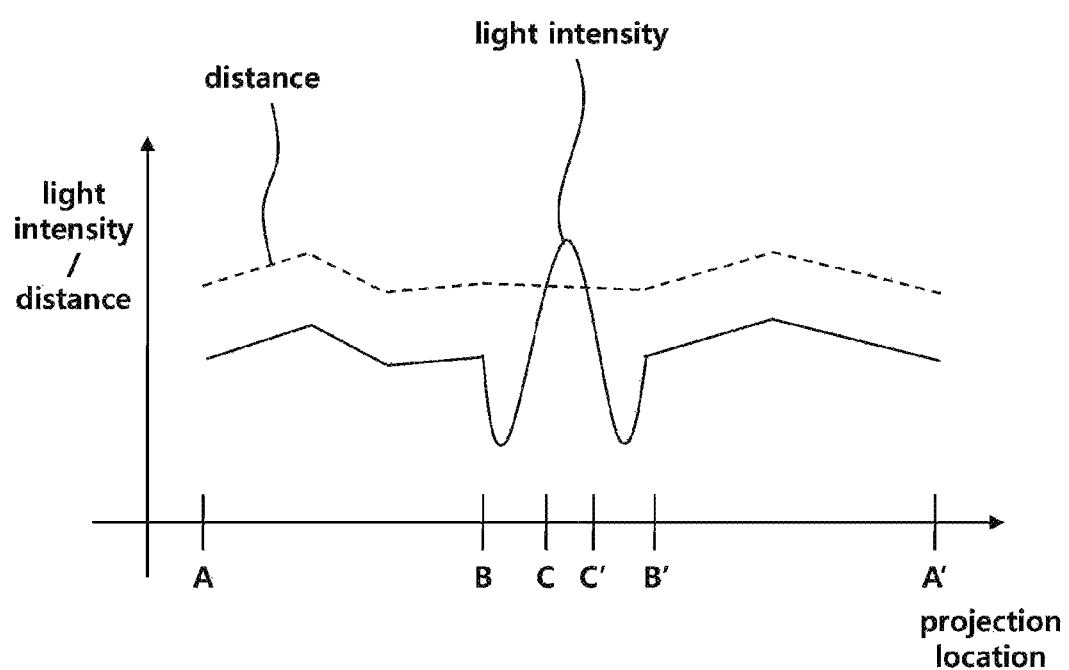
FIG. 20 illustrates a light intensity in A-A' of FIG. 11 and distance measurement values.

FIG. 20 illustrates light intensity in A-A' of FIG. 19 and distance measurement values.

Referring to FIG. 20, light is not diffused by the diffuser and thus has a high light intensity in a crack area C-C', and light is not appropriately projected and thus has a low light intensity in surrounding areas B-C and C'-B'.

When a light intensity pattern in one area of the image light corresponds to the crack pattern, the signal processing device may operate the beam projector module in the eye-safety mode. For example, when left and right light intensities in one area of the image light are low and a light intensity at the center is high, the signal processing device may determine that the light intensity pattern in one area corresponds to the crack pattern.

In another example, when the light intensity pattern in one area of the image light has a Gaussian distribution form, the signal processing device may determine that the light intensity pattern in one area corresponds to the crack pattern.

The signal processing device may measure the distance from the object by analyzing the image light. Further, when the measured light intensity is higher than the light intensity in one area expected according to the distance measurement value in one area of the image light by a predetermined reference or more, the signal processing device may determine that the light intensity pattern in one area corresponds to the crack pattern.

The signal processing device may measure the distance from the object by analyzing the image light and compare the distance measurement value pattern in one area and the light intensity pattern, so as to detect the crack pattern. As illustrated in FIG. 20, when an area in which the distance measurement value pattern is different from the light intensity pattern is identified, the signal processing device may determine that the light intensity pattern in the corresponding area corresponds to the crack pattern.

Although the first embodiment, the second embodiment, and the third embodiments are separately described, configurations of the respective embodiments may be combined to create an additional effect. For example, the beam projector module according to the second embodiment and the third embodiment may include the configuration according to the first embodiment, and the beam projector module may not only detect the crack of the optical device but also accurately detect detachment of the optical device.

As described above, according to the present embodiment, it is possible to safely protect user's eyes even though the beam projector has a fault.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A beam projector module comprising:
    a light source configured to output light in a driving section and block the output of the light in a non-driving section;
    an optical device configured to reduce the intensity of the output light;
    a light-receiving device configured to measure the intensity of a diverted light which has been diverted by passing through the optical device; and
    a processor configured to perform an eye safety function when a first light intensity-measured by the light-receiving device in the driving section corresponds to a preset first abnormal range and when the light intensity measured by the light-receiving device in the driving section corresponds to a preset normal range but a second light intensity measured by the light-receiving device in the non-driving section corresponds to a preset second abnormal range, wherein the preset first abnormal range and the preset second abnormal range are different.

2. The beam projector module of claim 1, wherein the light source comprises a Vertical-Cavity Surface-Emitting Laser (VCSEL), and the optical device comprises a diffuser for diffusing the light.

3. The beam projector module of claim 1, wherein the first abnormal range is a range in which the first light intensity is lower than a preset first abnormal intensity, the normal range is a range in which the first light intensity is higher than a preset normal intensity, and the second abnormal range is a range in which the second light intensity is higher than a preset second abnormal intensity, wherein the first abnormal intensity is lower than the normal intensity, and the second abnormal intensity is higher than the first abnormal intensity and lower than the normal intensity.

4. The beam projector module of claim 1, wherein a time generated by adding the driving section and the non-driving section is shorter than a predefined eye-safety operation time.

5. The beam projector module of claim 1, wherein the driving section and the non-driving section are repeated according to a predetermined period, and the predetermined period is shorter than a predefined eye-safety operation time.

6. A beam projector module comprising;
- a light source configured to output a light in a driving section and to block the output of light in a non-driving section, wherein a light output from the light source has a predetermined waveform;
- an optical device configured to reduce the intensity of the output light;
- a light-receiving device configured to measure the intensity of a diverted light which has been diverted by passing through the optical device; and
- a processor configured to perform an eye safety function when a light intensity measured by the light-receiving device in the driving section is lower than a reference intensity and when the light intensity measured by the light-receiving device in the driving section is higher than the reference intensity and a value of the similarity between a waveform measured by the light-receiving device in the non-driving section and the predetermined waveform is equal to or smaller than a predetermined value.

7. The beam projector module of claim 6, wherein the processor compares periods of the predetermined waveform and the waveform measured by the light-receiving device to determine the similarity therebetween.

8. The beam projector module of claim 7, wherein the processor further compares a time length of a driving section in which the intensity of light is relatively high during a period and a time of a non-driving section in which the intensity of light is relatively lower than that in the driving section during the period to determine the similarity therebetween.

9. The beam projector module of claim 6, wherein the processor compares frequencies of the predetermined waveform and the waveform measured by the light-receiving device to determine the similarity therebetween.

10. The beam projector module of claim 6, wherein the processor compares duties of the predetermined waveform and the waveform measured by the light-receiving device to determine the similarity therebetween, wherein the duty is a ratio of a driving section to a period.

* * * * *